(12) United States Patent
Yang et al.

(10) Patent No.: US 11,016,769 B1
(45) Date of Patent: May 25, 2021

(54) METHOD AND APPARATUS FOR PROCESSING INFORMATION

(71) Applicant: Baidu Online Network Technology (Beijing) Co., Ltd., Beijing (CN)

(72) Inventors: Bibo Yang, Beijing (CN); Xiaoping Yan, Beijing (CN); Chao Tian, Beijing (CN); Junhui Wen, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/890,665

(22) Filed: Jun. 2, 2020

(30) Foreign Application Priority Data

Dec. 31, 2019 (CN) .......................... 201911402401.9

(51) Int. Cl.
*G06F 9/30* (2018.01)
*G06F 9/445* (2018.01)
*G06F 13/28* (2006.01)

(52) U.S. Cl.
CPC ...... *G06F 9/30109* (2013.01); *G06F 9/30101* (2013.01); *G06F 9/30145* (2013.01); *G06F 9/44505* (2013.01); *G06F 13/28* (2013.01)

(58) Field of Classification Search
CPC ............. G06F 9/30101; G06F 9/30145; G06F 9/44505
See application file for complete search history.

(56) References Cited

U.S. PATENT DOCUMENTS

| 8,484,441 B2 * | 7/2013 | Knowles ............... G06F 9/3853 712/200 |
| 10,409,615 B2 * | 9/2019 | Chen ......................... G06F 7/57 |

(Continued)

FOREIGN PATENT DOCUMENTS

| CN | 105426274 A | 3/2016 |
| CN | 105512092 A | 4/2016 |

(Continued)

OTHER PUBLICATIONS

Okada et al., "A New Delta Compression Algorithm Suitable for Program Updating in Embedded Systems," FUJITSU Laboratories Ltd., 2003, 1 page.

(Continued)

*Primary Examiner* — Zachary K Huson
(74) *Attorney, Agent, or Firm* — Seed IP Law Group LLP

(57) ABSTRACT

Embodiments of the present disclosure relate to a method and apparatus for processing information. The method may include: determining an instruction category of an instruction based on an instruction operation code of the acquired instruction, where the instruction category includes a dedicated instruction including register selection information, base address information, and a length of to-be-read data; sending, in response to determining that the instruction is the dedicated instruction, the dedicated instruction to a preset operator for the operator to perform following operation steps: selecting a configuration register group from preset configuration register groups as a target configuration register group according to the register selection information; reading configuration information from the target configuration register group based on the base address information and the length of the to-be-read data; performing a preset operation for the configuration information.

15 Claims, 5 Drawing Sheets

(56) References Cited

U.S. PATENT DOCUMENTS

2019/0377395 A1* 12/2019 Kaburlasos ........... G06F 1/3206
2021/0049039 A1* 2/2021 Drepper ................. G06F 9/505

FOREIGN PATENT DOCUMENTS

| CN | 106775579 A | 5/2017 |
| CN | 107315715 A | 11/2017 |
| CN | 110390385 A | 10/2019 |
| EP | 1634164 A2 | 3/2006 |
| KR | 10-2016-0070631 A | 6/2016 |
| WO | 2004/111834 A2 | 12/2004 |

OTHER PUBLICATIONS

"A simple and efficient FCU controlled sub-system platform," Jan. 15, 2014, 60 pages.

* cited by examiner

METHOD AND APPARATUS FOR PROCESSING INFORMATION

CROSS-REFERENCE TO RELATED APPLICATIONS

This application claims priority to Chinese Application No. 201911402401.9, filed on Dec. 31, 2019 and entitled "Method and Apparatus for Processing Information," the entire disclosure of which is hereby incorporated by reference.

TECHNICAL FIELD

Embodiments of the present disclosure relate to the field of computer technology, and specifically to a method and apparatus for processing information.

BACKGROUND

The Reduced Instruction Set Computer (RISC) is relative to the Complex Instruction Set Computer (CISC). CISC relies on increasing the hardware structure of the machine to meet increasing performance requirements for computers. The development of computer structures has been dominated by increasingly complex processors. In order to reduce the differences between computer operations and high-level languages, and in order to improve the operating characteristics of machines, there are more and more machine instructions and more complex instruction systems. In particular, the contradiction between the earlier higher-speed central processing unit (CPU) and the slower-speed memory has greatly developed a complex instruction set in order to minimize the number of data accesses and increase the speed of the machine. However, with the development of semiconductor processing technology, the speed of memory is constantly improved, especially the use of high-speed buffers, so that the computer architecture is fundamentally changed. At the same time of the improvement of the hardware technology, the software has made equally important progress in optimizing the compiler so that the execution time of the program is reduced as much as possible and the memory occupied by the machine language is reduced to a minimum. With advanced memory technology and advanced compiler, the CISC architecture is no longer applicable, thus the RISC architecture is emerged. The basic starting point of the RISC technology is to reduce the complexity of the hardware design and increase the instruction execution speed by fine-tuning the machine instruction system.

In the design of the end-side Artificial Intelligence (AI) inference chip, the RISC instruction set can be used to significantly reduce the chip area, cost and power consumption, and bring strong product competitiveness. However, for an end-side AI inference chip designed for a specific application field, the application scenario and typical calculation load of the end-side AI inference chip have characteristics of a dedicated chip, and it is difficult to improve the operation efficiency of the end-side AI inference chip by simply using a general-purpose RISC instruction set.

SUMMARY

Embodiments of the present disclosure provide a method and apparatus for processing information.

In a first aspect, an embodiment of the present disclosure provides a method for processing information, the method including: determining an instruction category of an instruction based on an instruction operation code of the acquired instruction, the instruction category including a dedicated instruction including register selection information, base address information and a length of to-be-read data; and sending, in response to determining that the instruction is the dedicated instruction, the dedicated instruction to a preset operator for the operator to perform following operation steps: selecting a configuration register group from preset configuration register groups as a target configuration register group according to the register selection information; reading configuration information from the target configuration register group according to the base address information and the length of the to-be-read data; performing a preset operation for the configuration information.

In some embodiments, the instruction category further includes a general instruction including first register determination information, second register determination information, and third register determination information for determining a register from a preset register group; and the method further includes: performing, in response to determining that the instruction is the general instruction, following operation steps: acquiring data in a register determined by the first register determination information as a first operand; acquiring data in a register determined by the second register determination information as a second operand; performing a preset operation on the first operand and the second operand to obtain an operation result; and storing the operation result into a register determined by the third register determination information.

In some embodiments, before acquiring the instruction, the method further includes: storing preset configuration information into a preset memory.

In some embodiments, the method further includes: configuring data transfer configuration information of a DMA controller, the data transfer configuration information being used to indicate to-be-transferred data; and sending a start instruction to the DMA controller, so that the DMA controller performs a following data transfer step after receiving the start instruction: transferring the configuration information stored in the memory to the configuration register group according to the data transfer configuration information.

In some embodiments, the transferring the configuration information stored in the memory to the configuration register group according to the data transfer configuration information includes: determining a state of the configuration register group; and transferring the configuration information from the memory to the configuration register group according to the determined state.

In a second aspect, an embodiment of the present disclosure further provides an apparatus for pushing information, the apparatus including: a determining unit configured to determine an instruction category of an instruction based on an instruction operation code of the acquired instruction, the instruction category including a dedicated instruction including register selection information, base address information and a length of to-be-read data; and an arithmetic unit configured to, send, in response to determining that the instruction is the dedicated instruction, the dedicated instruction to a preset operator for the operator to perform following operation steps: selecting a configuration register group from preset configuration register groups as a target configuration register group according to the register selection information; reading configuration information from the target configuration register group according to the base address information and the length of the to-be-read data; performing a preset operation for the configuration information.

In some embodiments, the instruction category further includes a general instruction including first register determination information, second register determination information, and third register determination information for determining a register from a preset register group; and the apparatus further includes: an operating unit configured to, perform, in response to determining that the instruction is the general instruction, following operation steps: acquiring data in a register determined by the first register determining information as a first operand; acquiring data in a register determined by the second register determination information as a second operand; performing a preset operation on the first operand and the second operand to obtain an operation result; and storing the operation result into a register determined by the third register determination information.

In some embodiments, the apparatus further includes: a storage unit configured to store preset configuration information into a preset memory.

In some embodiments, the apparatus further includes: a configuration unit configured to configure data transfer configuration information of a DMA controller, the data transfer configuration information being used to indicate to-be-transferred data; and a start-up unit configured to send a start instruction to the DMA controller, so that the DMA controller performs a preset data transfer step after receiving the start instruction, the DMA controller including a transfer unit configured to transfer configuration information stored in the memory to the configuration register group according to the data transfer configuration information.

In some embodiments, the transfer unit is further configured to: determine a state of the configuration register group; and transfer the configuration information from the memory to the configuration register group according to the determined state.

In a third aspect, an embodiment of the present disclosure further provides a terminal, the terminal including one or more processors; and a storage apparatus, storing one or more programs, the one or more programs, when executed by the one or more processors, cause the one or more processors to implement the method according to any one of implementations according to the first aspect.

In a fourth aspect, an embodiment of the present disclosure further provides a computer readable medium, storing a computer program thereon, the computer program, when executed by a processor, causes the processor to implement the method according to any one of implementations in the first aspect.

The method and apparatus for processing information according to embodiments of the present disclosure determine an instruction category of an instruction based on an instruction operation code of the acquired instruction. If it is determined that the instruction is a dedicated instruction, the dedicated instruction is sent to an operator for the operator to perform the following operation steps: first, a configuration register group is selected from preset configuration register groups according to the register selection information as a target configuration register group; thereafter, the configuration information is read from the target configuration register group according to the base address information and the length of the to-be-read data; finally, a preset operation is performed for the configuration information. Therefore, the problem of extending dedicated instructions in a reduced instruction set processor architecture is solved.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
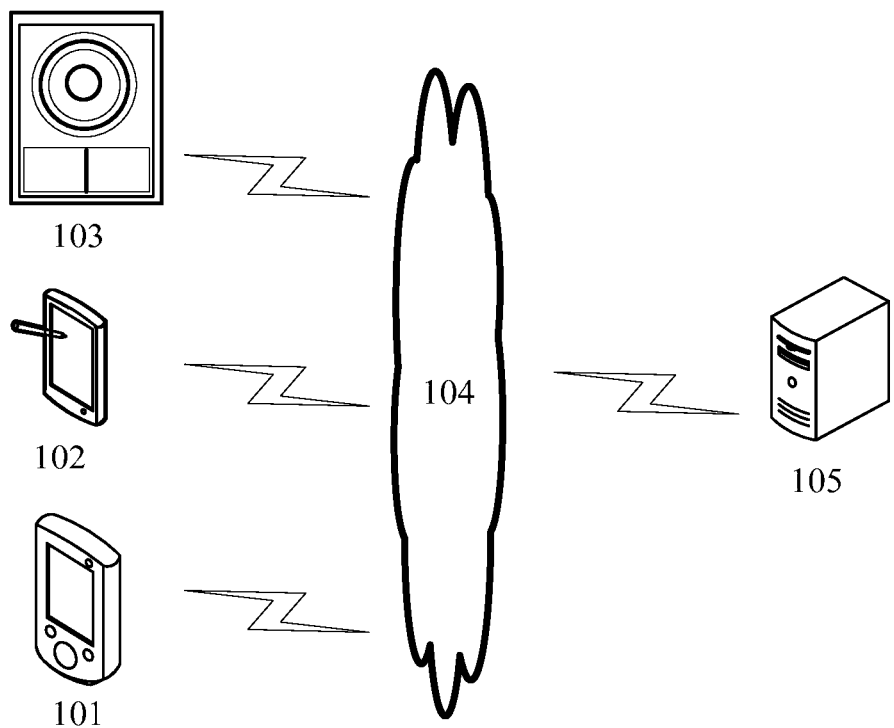
FIG. 1 is a diagram of an example system architecture in which embodiments of the present disclosure may be implemented.

FIG. 1 illustrates an example system architecture 100 in which a method for processing information or an apparatus for processing information of embodiments of the present disclosure may be implemented.

As shown in FIG. 1, the system architecture 100 may include terminal devices 101, 102, 103, a network 104, and a server 105. The network 104 serves as a medium for providing a communication link between the terminal devices 101, 102, 103 and the server 105. The network 104 may include various types of connections, such as wired or wireless communication links, or optical fiber cables, among others.

The user may interact with the server 105 through the network 104 using the terminal devices 101, 102, 103 to receive or send messages, etc. The terminal devices 101, 102, 103 may have various communication client applications installed thereon, such as a play-type application, a search-type application, an image processing-type application, an instant messaging tool, social platform software, or the like.

The terminal devices 101, 102, 103 may be hardware or software. When the terminal devices 101, 102, 103 are hardware, the terminal devices 101, 102, 103 may be various electronic devices having an RISC processor and an operator, including but not limited to a smartphone, a tablet computer, a smart speaker, an in-vehicle voice device, or the like. When the terminal devices 101, 102, and 103 are software, the terminal devices 101, 102, 103 may be installed in the electronic devices listed above. It may be implemented as a plurality of software programs or software modules (e.g., for providing distributed services) or as a single software program or software module. It is not specifically limited herein.

The server 105 may be a server providing various services, such as a backend server providing support for information displayed on the terminal devices 101, 102, 103. The backend server may perform processing such as analysis on received data such as a request, and feed back processing results to the terminal devices 101, 102, and 103.

It should be noted that the server 105 may be hardware or software. When the server 105 is hardware, the server 105 may be implemented as a distributed server cluster of a plurality of servers, or the server 105 may be implemented as a single server. When the server 105 is software, the server 105 may be implemented as a plurality of software programs or software modules (e.g., for providing distributed services), or a plurality of may be implemented as a single software program or software module. It is not specifically limited herein.

It should be noted that the method for processing information provided in embodiments of the present disclosure is generally performed by the terminal devices 101, 102, 103, and accordingly, the apparatus for processing information is generally provided in the terminal devices 101, 102, 103. It should be understood that the numbers of terminal devices, networks and servers in FIG. 1 are merely illustrative. Any number of terminal devices, networks, and servers may be provided based on actual requirements.

Figure 2:
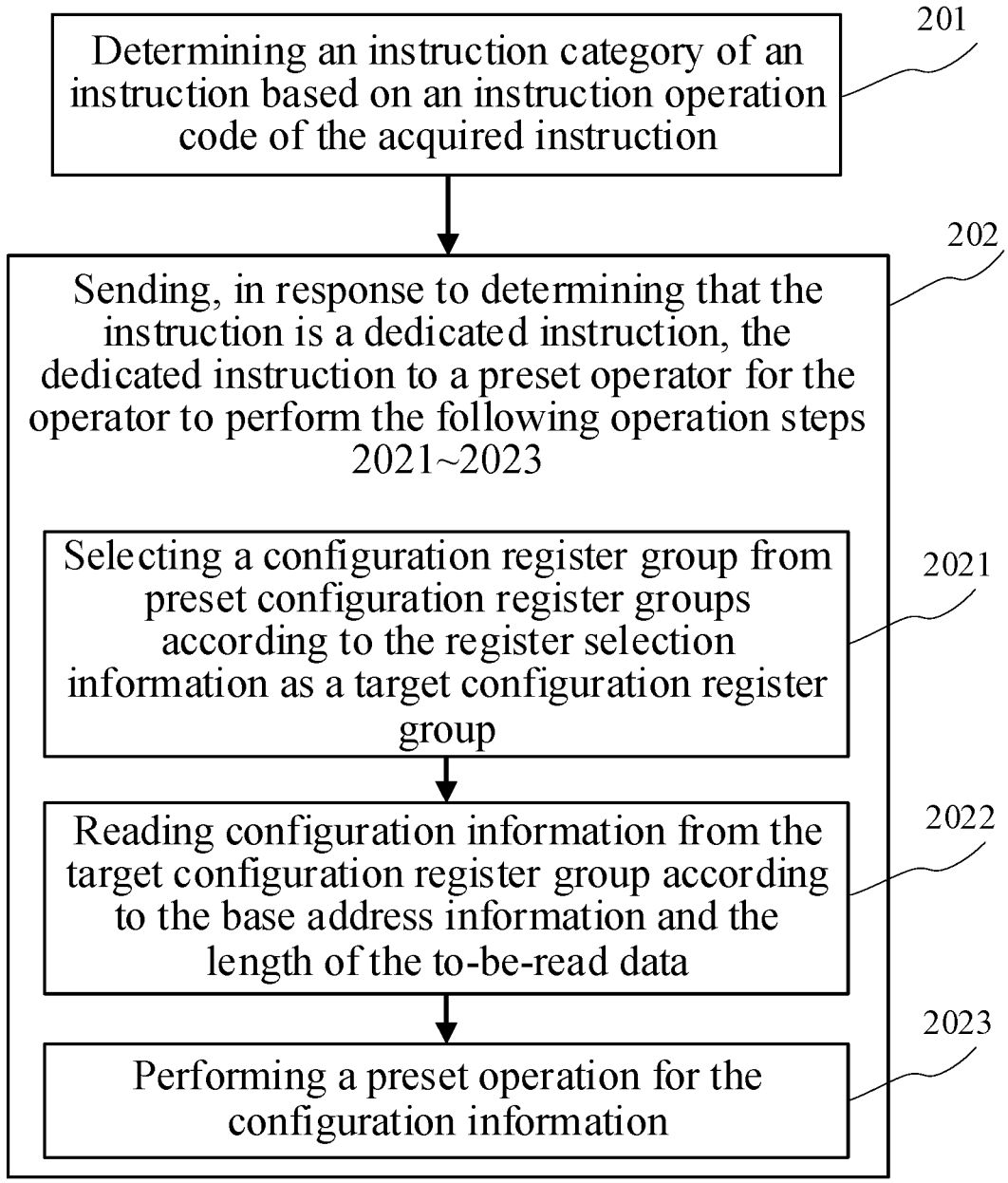
FIG. 2 is a flowchart of a method for processing information according to an embodiment of the present disclosure.

With further reference to FIG. 2, a flow 200 of a method for processing information according to an embodiment of the present disclosure is shown. The method for processing information includes the following steps.

Step 201, determining an instruction category of an instruction based on an instruction operation code of the acquired instruction.

In the present embodiment, the execution body of the method for processing information (for example, the terminal devices 101, 102, 103 shown in FIG. 1) may include a CPU and an operator. The CPU may be an RISC processor. RISC is a microprocessor that executes fewer types of computer instructions. In the RISC, the computer may execute instructions in each machine cycle, and simple or complex operations may be performed by a program block of simple instructions. Generally, each instruction has an operation code indicating the nature of the operation performed by the instruction, and different instructions are represented by different codes of the operation code field. Therefore, the execution body may determine the instruction category of the acquired instruction based on the instruction operation code of the acquired instruction. Here, the instruction category may include a general instruction and a dedicated instruction.

In a computer, a command instructing computer hardware to perform a certain operation or a processing function is referred to as an instruction. The instructions are the smallest functional units that the computer runs, and the hardware functions to perform the functions specified for each instruction. The set of all instructions on a computer is the computer's instruction system. The instruction system, also known as the instruction set, is the embodiment of all the functions of the computer. RISC and CISC are two classes that the CPU divides from the characteristics of the instruction set. In practice, each CPU is designed to specify a series of instructions that cooperate with the hardware circuit of the CPU. Here, the general instruction may refer to an instruction that cooperates with the hardware circuit of the CPU of the execution body. The specific instruction may refer to an instruction that cooperates with the hardware circuit of the operator of the execution body. Here, the operator may be an AI accelerator added according to an actual application scenario.

Figure 3:
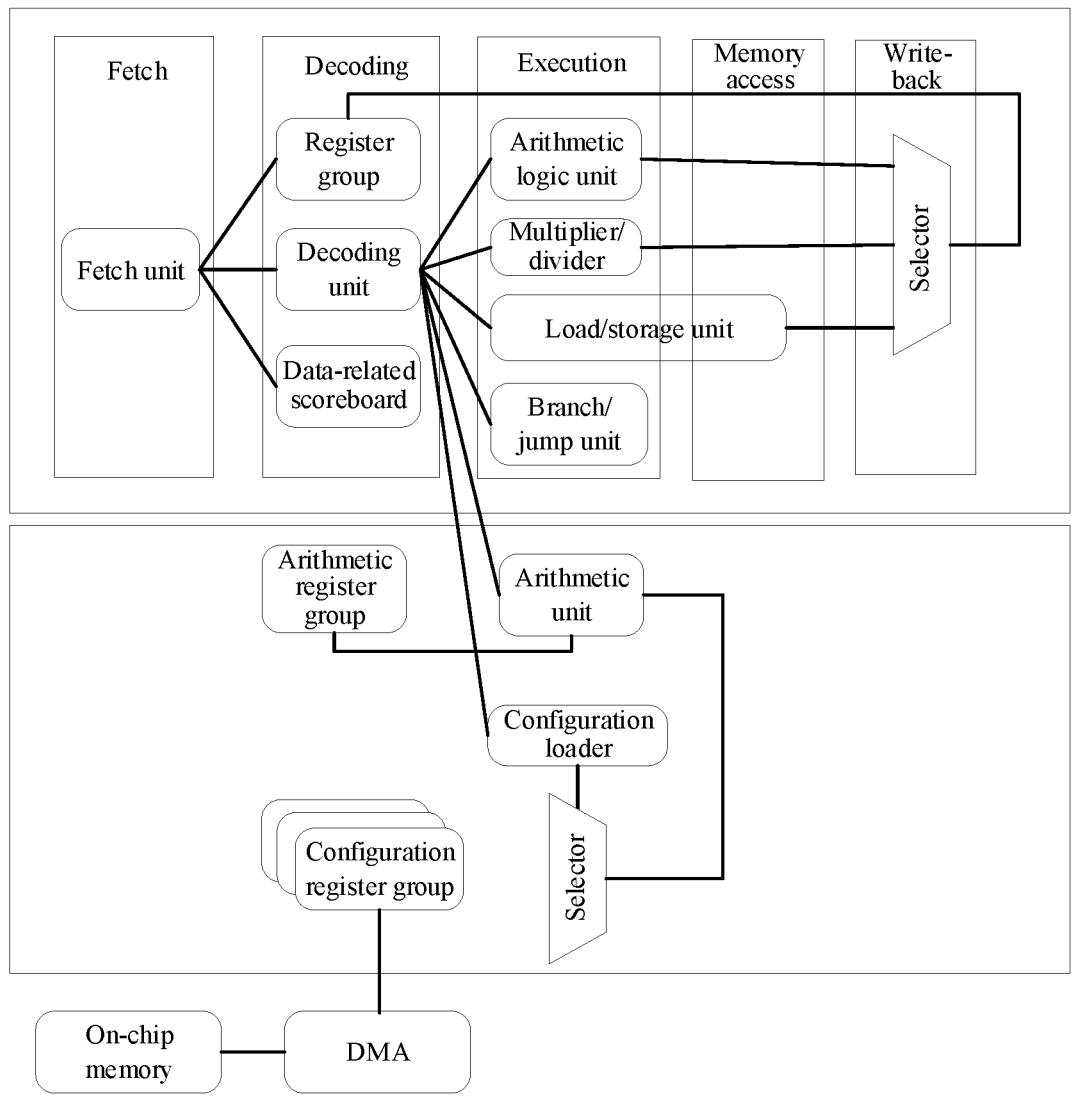
FIG. 3 is a schematic diagram of a hardware portion of a method for processing information suitable for implementing an embodiment of the present disclosure.

Referring to FIG. 3, a logical block diagram of a standard five-stage pipeline RISC processor is shown in the block of upper half of FIG. 3. The five-stage pipeline includes a fetch stage, a decoding stage, an execution stage, a memory access stage, and a write-back stage. The fetch stage sends the fetched instruction to the decoding stage, the decoding stage reads the data in the register group according to the information in the instruction format and sends the data to the execution stage, the execution stage performs operation processing on the data and sends the operation result to the write-back stage, and the write-back stage selects one of operation results of a plurality of execution stages to write back to the register group according to priorities. It will be appreciated that since the five-stage pipeline RISC processor is a well-known technique widely studied and applied at present, the functions of the decoding unit, the data-related scoreboard, the arithmetic logic unit, and the like in the block of the upper half of FIG. 3 will not be described again.

The hardware units and register groups added by the operator during the two stages of decoding and execution are shown in the block of lower half of FIG. 3. The hardware units may include an arithmetic unit, a configuration loader, or the like, and the register groups may include an arithmetic register group and a configuration register group. Here, the configuration register group may have a special structure, that is, a plurality of configuration register groups may coexist (the coexistence of the plurality of configuration register groups may be implemented in an address-accessible manner or in an access manner of first-in and first-out). The content of the configuration register group may be transmitted to the arithmetic unit of the execution stage through the selector. The content of which group of configuration registers is specifically selected is selected by the configuration loader according to the instruction information transmitted from the decoding stage.

The portion outside the lower block of FIG. 3 is an additional circuit other than the RISC processor. The Direct Memory Access (DMA) controller is responsible for loading the accelerator configuration information in batches to the configuration register group. Since the number of configuration register groups is limited, the on-chip memory may contain much more configuration information than the configuration register groups. Therefore, when the number of configuration information groups is large, only part of the configuration information groups can be loaded into the configuration register groups, and subsequent configuration information groups need to be gradually loaded by the DMA controller according to the speed at which the arithmetic unit consumes the configuration information groups. It should be noted that that the operation information of the DMA controller, that is, the addresses and group number of configuration information groups stored on the on-chip memory, may be pre-configured by the RISC processor.

After the RISC processor starts the DMA controller, the DMA controller can run independently of the RISC processor without the RISC processor intervention.

In practice, the RISC instructions may be in a fixed length instruction format, e.g., 32 bits, 64 bits, etc., in order to facilitate hardware decoding. Here, the lengths of the general instruction and the dedicated instruction may be equal, both of which are fixed lengths. As an example, the instruction in this embodiment may be a 32-bit instruction. Bits 0 to 6 in the instruction may represent an instruction operation code, and the instruction operation code may be used to distinguish the general instruction from the dedicated instruction. The dedicated instruction may include register selection information, base address information, and a length of to-be-read data. As an example, when the instruction is a dedicated instruction, bits 7 to 11 of the 32 bits may be register selection information for selecting one of a plurality of configuration register groups, or an address portion in an address accessible implementation. Bits 15 to 19 of the 32 bits may be base address information, and may be used to identify a base address in a specific configuration register group. Bits 20 to 24 of the 32 bits may be the length of the to-be-read data, and may be used to identify the length of to-be-read bytes in the specific configuration register group.

In some alternative implementations of the present embodiment, the above-described method for processing information may further include storing preset configuration information to a preset memory before the instruction is acquired.

In the present embodiment, the execution body may store the preset configuration information to the preset memory. As an example, the preset memory may be an on-chip memory other than the RISC processor. As an example, the RISC processor may configure a plurality of configuration information groups into the on-chip memory at the initialization stage, where a configuration information group may refer to information required for an operator to perform a single operation.

In some alternative implementations, the method for processing information described above may further include following steps.

First, the data transfer configuration information of the DMA controller is configured.

In the present embodiment, the execution body may configure the data transfer configuration information of the DMA controller. Here, the data transfer configuration information may be used to indicate to-be-transferred data. For example, the data transfer configuration information may include a base address and a transmission byte length. As an example, in the start-up stage, the RISC processor may configure the base address and transfer byte length of the DMA controller.

Then, a start instruction is sent to the DMA controller, so that the DMA controller performs the following data transfer step after receiving the start instruction: transferring the configuration information stored in the memory to the configuration register group according to the data transfer configuration information.

In the present embodiment, the RISC processor may send a start instruction to the DMA controller so that the DMA controller may perform the following data transfer step after receiving the start instruction: transferring the configuration information stored in the memory to the configuration register group according to the data transfer configuration information.

In practice, in the process of executing the end-side AI inferring, the parameter information and the like required for the inferring operation of the neural network may be obtained in advance, and the parameter information has been fixed before the start of the operation and is represented by the weight value and the configuration information of each layer of the neural network. Based on this principle, the configuration information required by computing each layer of the neural network may be loaded in batches before the operator starts, thereby saving time for loading the configuration information during the operation of the operator. In addition, since the DMA controller can operate independently of the RISC processor, the RISC processor performs operations in parallel with the DMA controller transferring the configuration information group, thereby further saving the operation time and improving the operation efficiency.

Optionally, based on the data transfer configuration information, the configuration information stored in the memory may be transferred to the configuration register group as follows.

First, the state of the configuration register group is determined.

In this embodiment, after the DMA controller is started, the DMA controller may first determine the states of the plurality of configuration register groups, and determine whether the state of the configuration register groups is not full. As an example, the DMA controller may determine whether the state of the configuration register group is not full based on the relationship between the read pointer of the configuration loader and the write pointer of the DMA controller. Here, if the state is not full, it indicates that there is space left in the configuration register group and data can be transferred to the configuration register group. If the state is full, it indicates that there is no space left in the configuration register group and data cannot be transferred to the configuration register group.

Then, configuration information is transferred from the memory to the configuration register group according to the determined state.

In the present embodiment, the DMA controller may transfer the configuration information from the memory to the configuration register group according to the determined state of the configuration register group. For example, when the state of the configuration register group is not full, the DMA controller may transfer configuration information from the memory to the configuration register group. When the state of the configuration register group is not full, the DMA controller waits and inquires in real time the change of the read pointer of the configuration loader until it is determined that the state of the configuration register group is not full.

Step 202, sending, in response to determining that the instruction is a dedicated instruction, the dedicated instruction to a preset operator for the operator to perform the following operation steps 2021-2023.

In the present embodiment, if it is determined that the acquired instruction is a dedicated instruction, the execution body may send the dedicated instruction to the operator for the operator to perform the following operation steps 2021-2023.

Step 2021, selecting a configuration register group from preset configuration register groups according to the register selection information as a target configuration register group.

In the present embodiment, after receiving the dedicated instruction, the operator may select a register group from the preset plurality of configuration register groups as the target configuration register group according to the register selection information in the dedicated instruction. For example, in the decoding stage, the decoding unit parses the instruction operation code. When the instruction is determined to be a dedicated instruction, the decoding unit sends the register selection information in the dedicated instruction to the configuration loader in the execution stage, and the configuration loader selects a configuration register group from the plurality of configuration register groups as the target configuration register group according to the register selection information.

Step 2022, reading configuration information from the target configuration register group according to the base address information and the length of the to-be-read data.

In the present embodiment, after determining the target configuration register group, the operator may read the configuration information from the target configuration register group according to the base address information and the length of the to-be-read data in the dedicated instruction. For example, after determining the target configuration register group, the configuration loader in the operator may start reading the configuration information of the length specified by the length of the to-be-read data at the base address specified by the base address information of the target configuration register group to the arithmetic unit. By way of example, the configuration information may include, but is not limited to, a series of information such as a register address in the operation register group, a register address in the register group of the RISC processor, parameter information required for the operator to perform the inferring operation of the neural network, and the like. Thus, the length of the configuration information far exceeds the 32-bit capacity of the RISC instruction.

Step 2023, performing a preset operation for the configuration information.

In this embodiment, the operator may perform the preset operation using the configuration information obtained in step 2022. Here, the preset operation may refer to an operation that is executed as instructed by the acquired dedicated instruction. For example, the arithmetic unit of the operator may complete the arithmetic operation indicated by the dedicated instruction using the configuration information acquired in step 2022 to obtain the operation result. Thereafter, the arithmetic unit may write the operation result back to the operation register group or the register group of the RISC processor.

Figure 4:
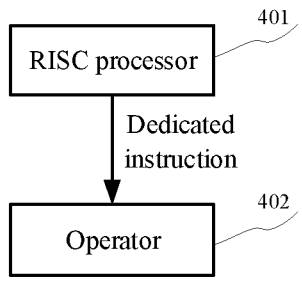
FIG. 4 is a schematic diagram of an application scenario of a method for processing information according to the present disclosure.

With further reference to FIG. 4, FIG. 4 is a schematic diagram of an application scenario of a method for processing information according to the present embodiment. In the application scenario of FIG. 4, the RISC processor 401 of the terminal device determines the instruction category of the instruction based on the instruction operation code of the acquired instruction. If it is determined that the instruction is a dedicated instruction, the RISC processor sends the dedicated instruction to the preset operator 402 for the operator 402 to perform the operation of selecting the configuration register group from the preset configuration register groups as the target configuration register group according to the register selection information. Thereafter, the configuration information is read from the target configuration register group according to the base address information and the length of the to-be-read data. Finally, a preset operation is performed for the configuration information.

The method provided in embodiments of the present disclosure uses an operator to process a dedicated instruction, thereby solving the problem of extending dedicated instructions in a reduced instruction set processor architecture.

Figure 5:
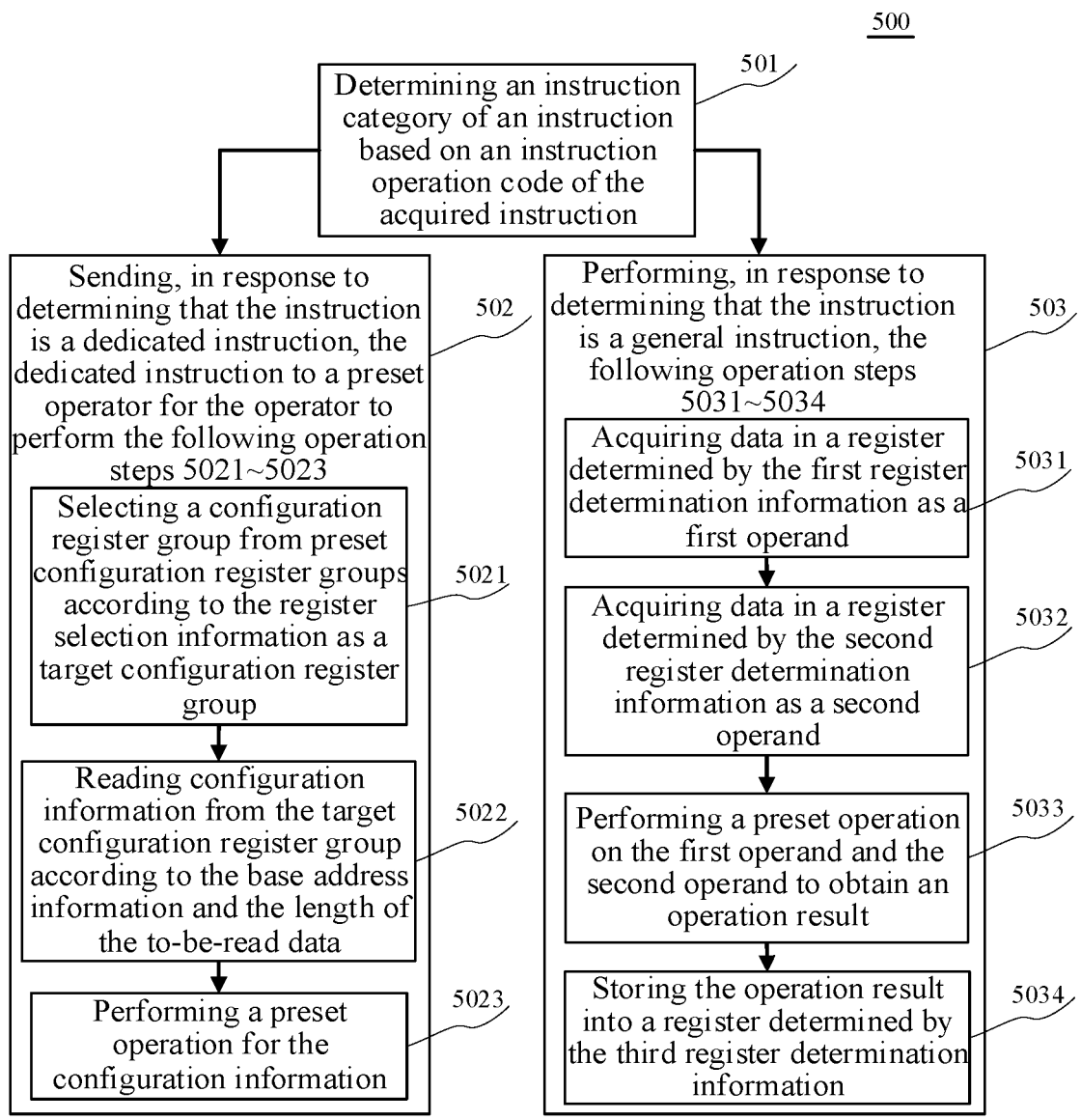
FIG. 5 is a flowchart of a method for processing information according to another embodiment of the present disclosure.

Referring further to FIG. 5, a flow 500 of another embodiment of a method for processing information is shown. The flow 500 of the method for processing information includes the following steps.

Step 501, determining an instruction category of an instruction based on an instruction operation code of the acquired instruction.

In this embodiment, step 501 is similar to step 201 of the embodiment shown in FIG. 2, and details are not described herein.

Step 502, sending, in response to determining that the instruction is a dedicated instruction, the dedicated instruction to a preset operator for the operator to perform the following operation steps 5021-5023.

In the present embodiment, if it is determined that the acquired instruction is the dedicated instruction, the execution body may send the dedicated instruction to the operator for the operator to perform the following operations step 5021-5023.

Step 5021, selecting a configuration register group from preset configuration register groups according to the register selection information as a target configuration register group.

In this embodiment, step 5021 is similar to step 2021 of the embodiment shown in FIG. 2, and details are not described herein.

Step 5022, reading configuration information from the target configuration register group according to the base address information and the length of the to-be-read data.

In this embodiment, step 5022 is similar to step 2022 of the embodiment shown in FIG. 2, and details are not described herein.

Step 5023, performing a preset operation for the configuration information.

In the present embodiment, step 5023 is similar to step 2023 of the embodiment shown in FIG. 2, and details are not described herein.

Step 503, performing, in response to determining that the instruction is a general instruction, the following operation steps 5031-5034.

In this embodiment, the instruction category may also include a general instruction. The general instruction may include first register determination information, second register determination information, and third register determination information for determining a register from a preset register group. As an example, when the instruction is the general instruction, bits 7 to 11 of the 32 bits may be used to select a register in the register group, and the register may be used to store the instruction operation result. Bits 15 to 19 of the 32 bits may be used to select a register in the register group, and the register is used to store one of the instruction operation operands. Bits 20-24 of the 32 bits may be used to select a register in the register group, and the register is used to store another one of the instruction operation operands.

Here, when the execution body determines that the acquired instruction is the general instruction, the execution body may execute the following operation steps 5031-5034.

Step 5031, acquiring data in a register determined by the first register determination information as a first operand.

In the present embodiment, the execution body may acquire the data in the register determined by the first register determination information as the first operand.

Step 5032, acquiring data in a register determined by the second register determination information as a second operand.

In the present embodiment, the execution body may acquire the data in the register determined by the second register determination information as the second operand.

Step 5033, performing a preset operation on the first operand and the second operand to obtain an operation result.

In the present embodiment, the execution body may perform a preset operation on the first operand and the second operand. Here, the preset operation may refer to an operation that is executed as instructed by the acquired general instruction.

Step 5034, storing the operation result into a register determined by the third register determination information.

In the present embodiment, the execution body may store the operation result obtained in step 5033 in the register determined by the third register determination information.

As can be seen from FIG. 5, the flow 500 of the method for processing information in the present embodiment highlights the processing of a generic instruction when the instruction is the generic instruction as compared to the corresponding embodiment of FIG. 2. Thus, the solution described in this embodiment can perform different steps for different instruction categories, thereby implementing processing of the general instruction and the dedicated instruction.

Figure 6:
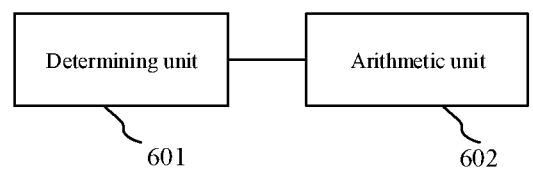
FIG. 6 is a schematic structural diagram of an apparatus for processing information according to an embodiment of the present disclosure.

With further reference to FIG. 6, as an implementation of the method shown in each of the above figures, an embodiment of the present disclosure provides an apparatus for processing information. An embodiment of the apparatus may correspond to an embodiment of the method shown in FIG. 2. The apparatus may be specifically applied to various electronic devices.

As shown in FIG. 6, the apparatus 600 for processing information in the present embodiment includes a determining unit 601 and an arithmetic unit 602. The determining unit 601 is configured to determine an instruction category of an instruction based on an instruction operation code of the acquired instruction, the instruction category includes a dedicated instruction including register selection information, base address information, and a length of to-be-read data; the arithmetic unit 602 is configured to, send, in response to determining that the instruction is the dedicated instruction, the dedicated instruction to a preset operator for the operator to perform following operation steps: selecting a configuration register group from preset configuration register groups as a target configuration register group according to the register selection information; reading configuration information from the target configuration register group based on the base address information and the length of the to-be-read data; performing a preset operation for the configuration information.

In the present embodiment, the specific processing of the determining unit 601 and the arithmetic unit 602 of the apparatus 600 for processing information and the technical effects thereof may be described with reference to the related descriptions of step 201 and step 202 in the corresponding embodiment in FIG. 2, and details are not described herein again.

In some alternative implementations of the present embodiment, the instruction category further includes a general instruction including first register determination information, second register determination information, and third register determination information for determining a register from a preset register group; and the apparatus 600 further includes an operating unit (not shown) configured to, perform, in response to determining that the instruction is the general instruction, following operation steps: acquiring data in a register determined by the first register determining information as a first operand; acquiring data in a register determined by the second register determination information as a second operand; performing a preset operation on the first operand and the second operand to obtain an operation result; and storing the operation result in a register determined by the third register determination information.

In some alternative implementations of the present embodiment, the apparatus 600 further includes a storage unit (not shown) configured to store preset configuration information into a preset memory.

In some alternative implementations of the present embodiment, the apparatus 600 further includes a configuration unit (not shown) configured to configure data transfer configuration information of a DMA controller, where the data transfer configuration information is used to indicate to-be-transferred data; a start-up unit (not shown) configured to send a start instruction to the DMA controller so that the DMA controller performs a preset data transfer step after receiving the start instruction, where the DMA controller includes a transfer unit configured to transfer configuration information stored in the memory to the configuration register group according to the data transfer configuration information.

In some alternative implementations of the present embodiment, the transfer unit is further configured to determine a state of the configuration register group; transferring the configuration information from the memory to the configuration register group according to the determined state.

Figure 7:
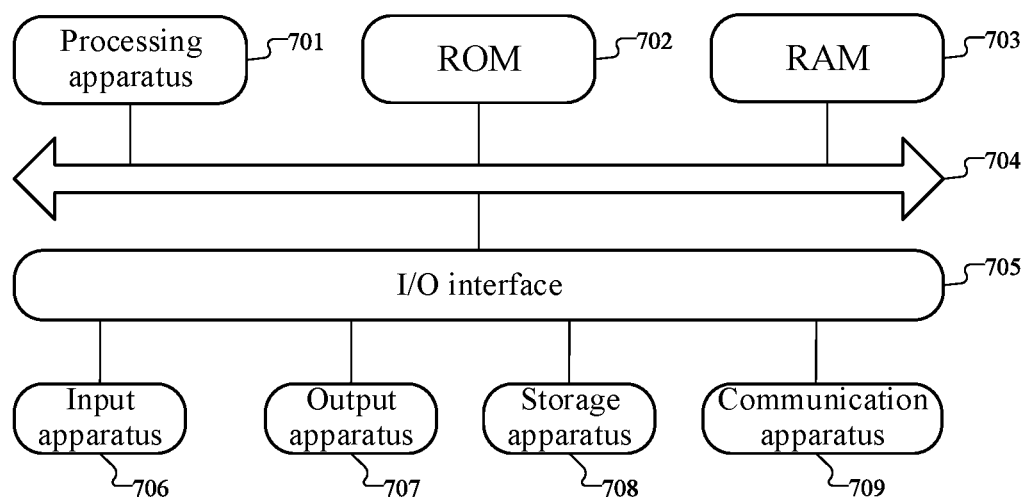
FIG. 7 is a schematic structural diagram of a computer system adapted to implement a terminal device of an embodiment of the present disclosure.

Referring now to FIG. 7, a schematic structural diagram adapted to implement an electronic device 700 (e.g., a terminal device in FIG. 1) of some embodiments of the present disclosure is shown. The terminal device shown in FIG. 7 is merely an example and should not be construed as limiting the functionality and scope of use of embodiments of the present disclosure.

As shown in FIG. 7, the electronic device 700 may include a processing apparatus (e.g., a central processing unit, a graphics processor, an operator, etc.) 701, which may perform various appropriate actions and processes according to a program stored in a read-only memory (ROM) 702 or a program loaded from a storage apparatus 708 into a random access memory (RAN) 703. In the RAM 703, various programs and data required for the operation of the electronic device 700 are also stored. The processing apparatus 701, ROM 702 and RAM 703 are connected to each other via a bus 704. An input/output (I/O) interface 705 is also connected to the bus 704.

Generally, the following apparatuses may be connected to the I/O interface 705: an input apparatus 706 including, for example, a touch screen, a touch pad, a keyboard, a mouse, a camera, a microphone, an accelerometer, a gyroscope, or the like; an output apparatus 707 including, for example, a liquid crystal display (LCD), a speaker, a vibrator, or the like; a storage apparatus 708 including, for example, a magnetic tape, a hard disk, or the like; and a communication apparatus 709. The communication apparatus 709 may allow the electronic device 700 to exchange data with other devices through wireless or wired communication. While FIG. 7 shows the electronic device 700 having various apparatuses, it should be understood that it is not necessary to implement or provide all of the apparatuses shown in the figure. More or fewer apparatuses may be alternatively implemented or provided. Each block shown in FIG. 7 may represent an apparatus, or represent a plurality of apparatuses as required.

In particular, according to some embodiments of the present disclosure, the process described above with reference to the flow chart may be implemented in a computer software program. For example, some embodiments of the present disclosure include a computer program product, which includes a computer program that is tangibly embedded in a computer readable medium. The computer program includes program codes for executing the method as shown in the flow chart. In such an embodiment, the computer program may be downloaded and installed from the network through the communication apparatus 709, or installed from the storage apparatus 708, or installed from the ROM 702. When the computer program is executed by the processing apparatus 701, the above functions defined in the method of the embodiment of the present disclosure are performed.

It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAN), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The computer readable medium may be included in the above electronic device; or a stand-alone computer readable medium without being assembled into the electronic device. The computer readable medium stores one or more programs. The one or more programs, when executed by the electronic device, cause the electronic device to: determine an instruction category of an instruction based on an instruction operation code of the acquired instruction, where the instruction category includes a dedicated instruction including register selection information, base address information, and a length of to-be-read data; sending, in response to determining that the instruction is a dedicated instruction, the dedicated instruction to a preset operator for the operator to perform following operation steps: selecting a configuration register group from preset configuration register groups as a target configuration register group according to the register selection information; reading configuration information from the target configuration register group based on the base address information and the length of the to-be-read data; performing a preset operation for the configuration information.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software, or may be implemented by hardware. The described units may also be provided in a processor, for example, described as: a processor including a determining unit and an arithmetic unit. The names of the units do not constitute a limitation to such units themselves in some cases. For example, the determining unit may be further described as "a unit configured to determine an instruction category of an instruction based on an instruction operation code of the acquired instruction."

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for processing information, the method comprising:
    determining an instruction category of an instruction based on an instruction operation code of the acquired instruction, the instruction category comprising a dedicated instruction comprising register selection information, base address information and a length of to-be-read data; and
    sending, in response to determining that the instruction is the dedicated instruction, the dedicated instruction to a preset operator for the operator to perform following operation steps: selecting a configuration register group from preset configuration register groups as a target configuration register group according to the register selection information; reading configuration information from the target configuration register group according to the base address information and the length of the to-be-read data; performing a preset operation for the configuration information.

2. The method according to claim 1, wherein the instruction category further comprises a general instruction comprising first register determination information, second register determination information, and third register determination information for determining a register from a preset register group; and
    the method further comprises:
    performing, in response to determining that the instruction is the general instruction, following operation steps: acquiring data in a register determined by the first register determination information as a first operand; acquiring data in a register determined by the second register determination information as a second operand; performing a preset operation on the first operand and the second operand to obtain an operation result; and storing the operation result into a register determined by the third register determination information.

3. The method according to claim 1, wherein before acquiring the instruction, the method further comprises:
    storing preset configuration information into a preset memory.

4. The method according to claim 3, further comprising:
    configuring data transfer configuration information of a DMA controller, the data transfer configuration information being used to indicate to-be-transferred data; and
    sending a start instruction to the DMA controller, so that the DMA controller performs a following data transfer step after receiving the start instruction: transferring the configuration information stored in the memory to the configuration register group according to the data transfer configuration information.

5. The method according to claim 4, wherein the transferring the configuration information stored in the memory to the configuration register group according to the data transfer configuration information comprises:
    determining a state of the configuration register group; and
    transferring the configuration information from the memory to the configuration register group according to the determined state.

6. An apparatus for processing information, the apparatus comprising:
    at least one processor; and
    a memory storing instructions, the instructions when executed by the at least one processor, causing the at least one processor to perform operations, the operations comprising:
    determining an instruction category of an instruction based on an instruction operation code of the acquired instruction, the instruction category comprising a dedicated instruction comprising register selection information, base address information and a length of to-be-read data; and
    sending, in response to determining that the instruction is the dedicated instruction, the dedicated instruction to a preset operator for the operator to perform following operation steps: selecting a configuration register group from preset configuration register groups as a target configuration register group according to the register selection information; reading configuration information from the target configuration register group according to the base address information and the length of the to-be-read data; performing a preset operation for the configuration information.

7. The apparatus according to claim 6, wherein the instruction category further comprises a general instruction comprising first register determination information, second register determination information, and third register determination information for determining a register from a preset register group; and
    the operations further comprise:
    performing, in response to determining that the instruction is the general instruction, following operation steps: acquiring data in a register determined by the first register determining information as a first operand; acquiring data in a register determined by the second register determination information as a second operand; performing a preset operation on the first operand and the second operand to obtain an operation result; and storing the operation result into a register determined by the third register determination information.

8. The apparatus according to claim 6, the operations further comprising:
    storing preset configuration information into a preset memory.

9. The apparatus according to claim 8, the operations further comprising:
    configuring data transfer configuration information of a DMA controller, the data transfer configuration information being used to indicate to-be-transferred data; and
    sending a start instruction to the DMA controller, so that the DMA controller performs a following data transfer step after receiving the start instruction: transferring the configuration information stored in the memory to the configuration register group according to the data transfer configuration information.

10. The apparatus according to claim 9, wherein transferring the configuration information stored in the memory to the configuration register group according to the data transfer configuration information comprises:
    determining a state of the configuration register group; and transferring the configuration information from the memory to the configuration register group according to the determined state.

11. A non-transitory computer readable medium, storing a computer program thereon, the computer program, when executed by a processor, causes the processor to perform operations, the operations comprising:

determining an instruction category of an instruction based on an instruction operation code of the acquired instruction, the instruction category comprising a dedicated instruction comprising register selection information, base address information and a length of to-be-read data; and sending, in response to determining that the instruction is the dedicated instruction, the dedicated instruction to a preset operator for the operator to perform following operation steps: selecting a configuration register group from preset configuration register groups as a target configuration register group according to the register selection information; reading configuration information from the target configuration register group according to the base address information and the length of the to-be-read data; performing a preset operation for the configuration information.

12. The non-transitory computer readable medium according to claim 11, wherein the instruction category further comprises a general instruction comprising first register determination information, second register determination information, and third register determination information for determining a register from a preset register group; and the operations further comprise:

performing, in response to determining that the instruction is the general instruction, following operation steps: acquiring data in a register determined by the first register determining information as a first operand; acquiring data in a register determined by the second register determination information as a second operand; performing a preset operation on the first operand and the second operand to obtain an operation result; and storing the operation result into a register determined by the third register determination information.

13. The non-transitory computer readable medium according to claim 11, the operations further comprising:

storing preset configuration information into a preset memory.

14. The non-transitory computer readable medium according to claim 13, the operations further comprising:

configuring data transfer configuration information of a DMA controller, the data transfer configuration information being used to indicate to-be-transferred data; and sending a start instruction to the DMA controller, so that the DMA controller performs a following data transfer step after receiving the start instruction: transferring the configuration information stored in the memory to the configuration register group according to the data transfer configuration information.

15. The non-transitory computer readable medium according to claim 14, wherein the transferring the configuration information stored in the memory to the configuration register group according to the data transfer configuration information comprises:

determining a state of the configuration register group; and transferring the configuration information from the memory to the configuration register group according to the determined state.

* * * * *